United States Patent
Snover et al.

(10) Patent No.: US 7,254,751 B2
(45) Date of Patent: Aug. 7, 2007

(54) SYSTEM AND METHOD FOR PERSISTING ERROR INFORMATION IN A COMMAND LINE ENVIRONMENT

(75) Inventors: Jeffrey P. Snover, Woodinville, WA (US); James W. Truher, Bellevue, WA (US); Bruce G. Payette, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 405 days.

(21) Appl. No.: 10/413,054

(22) Filed: Apr. 14, 2003

(65) Prior Publication Data

US 2004/0205415 A1 Oct. 14, 2004

(51) Int. Cl.
G06F 11/00 (2006.01)

(52) U.S. Cl. .............................. 714/48; 714/16; 714/18; 714/47

(58) Field of Classification Search .................. 714/47, 714/48, 49
See application file for complete search history.

(56) References Cited

U.S. PATENT DOCUMENTS

| 6,594,774 | B1 * | 7/2003 | Chapman et al. ............... 714/2 |
| 6,754,664 | B1 * | 6/2004 | Bush .......................... 707/102 |
| 6,857,085 | B1 * | 2/2005 | Ruhlen et al. ................ 714/38 |
| 6,944,800 | B2 * | 9/2005 | Brundridge et al. .......... 714/48 |
| 2004/0078724 | A1 * | 4/2004 | Keller et al. .................. 714/48 |

* cited by examiner

*Primary Examiner*—Scott Baderman
*Assistant Examiner*—Tim Bonura

(57) ABSTRACT

In a command line environment, an error object is used to store information about each occurrence of an error during processing of a command-line instruction. In an object-based command line environment, each command in a complex command-line instruction stores sufficient information in the error object to completely describe the error. That information may be later used either by subsequent commands or in conjunction with another command-line instruction to further process the unprocessed resources.

15 Claims, 5 Drawing Sheets

SYSTEM AND METHOD FOR PERSISTING ERROR INFORMATION IN A COMMAND LINE ENVIRONMENT

BACKGROUND OF THE INVENTION

Many operating systems provide a mechanism for "stitching" or "pipelining" multiple applications (e.g., utilities) together to create a custom, ad hoc command that can be entered on a command line of the operating system. These mechanisms are often used in system administration tools, such as for managing system resources or creating reports on system status. In conventional systems, each "pipelined" utility in the command line communicates with the next utility by passing the results of its operation as text. Thus, each utility in the pipeline is responsible for parsing the received text and for formatting output text. As one can imagine, if a sophisticated command is desired, a system administrator must understand several utilities well to properly pipeline them in a manner that will produce a meaningful output. Understanding the detailed inner-workings of each utility and correctly pipelining the several utilities is time-consuming and is challenging for system administrators.

If an error occurs during one or more of the operations in the pipeline, the system ends up in an indeterminate state because there is no record of the error set. For example, a pipeline of commands may operate on a bulk set of information, such as the names and details of all the files on a storage medium or volume. A first utility in a pipeline may be used to iteratively operate on each item in the bulk set of information and pass the results to a second utility. Errors often occur while the first utility is performing. For instance, the first utility may be performing a rename operation on multiple files but there may be a failure to rename several of the files, such as may occur if the user does not have sufficient privileges or if some of the files are locked in use.

Today, there are no good ways to handle the error. One way to handle the error is to simply stop processing the information on the first error. This option may leave the administrator with the task of discovering which items of information were not processed because of the error. Alternatively, the first utility may ignore the errors and simply continue processing only those items that do not cause an error. Again, the administrator does not know which of the items have not been processed. In some cases, the operation may simply be attempted again, but only in cases where repeating the operation does not achieve a different result than performing the operation the first time. For other operations, simply repeating the same operation on the entire bulk set of information would result in an unintended result.

An acceptable command-line solution that overcomes these problems has eluded those skilled in the art for some time.

SUMMARY OF THE INVENTION

The present invention is directed at a command-line architecture that is capable of identifying resources that are unprocessed due to an error while processing. Briefly stated, in a command line environment, an error object is used to store information about each occurrence of an error during processing of a command-line instruction. In an object-based command line environment, each command in a complex command-line instruction stores sufficient information in the error object to completely describe the error. That information may be later used either by subsequent commands or in conjunction with another command-line instruction to further process the unprocessed resources.

In one aspect, the present invention is directed at a system for receiving command-line instructions that include one or more commands. The system executes each of the commands in a serial fashion. In the event of an error while executing one or more of the commands, information about the error is stored in an object for subsequent used by another command. The object may be an error object, and the information may include an identification of the error, and information about each unprocessed resource due to the error.

In another aspect, the present invention is directed at a computer-readable medium in coated with a data structure with fields that identify a command in a command-line environment, an error that occurred while processing the command, and resources that were unprocessed by the command due to the error. The data structure may, optionally, further include information about resources input to the command, and results of processing the command. Alternatively, the input and results of processing the command may be stored in another data structure.

DETAILED DESCRIPTION OF THE PREFERRED EMBODIMENT

In one embodiment, the present invention provides an error object that is used in an object-based command-line environment. The error object is used by each command in a command-line instruction to store information about errors that occur during prosecution of that command. Multiple error objects may be used, one for each stage of the command-line instruction or, alternatively, a single error object may be used that contains information about each error. At the conclusion of execution, the information in the error object may be used to further process any unprocessed resources.

The following detailed description is divided into several sections. A first section describes an illustrative computing environment in which the present invention may operate. A second section describes an exemplary implementation for persisting error information in a command-line environment. And a third section describes an exemplary process for persisting error information in a command-line environment, in accordance with the present invention.

Figure 1:
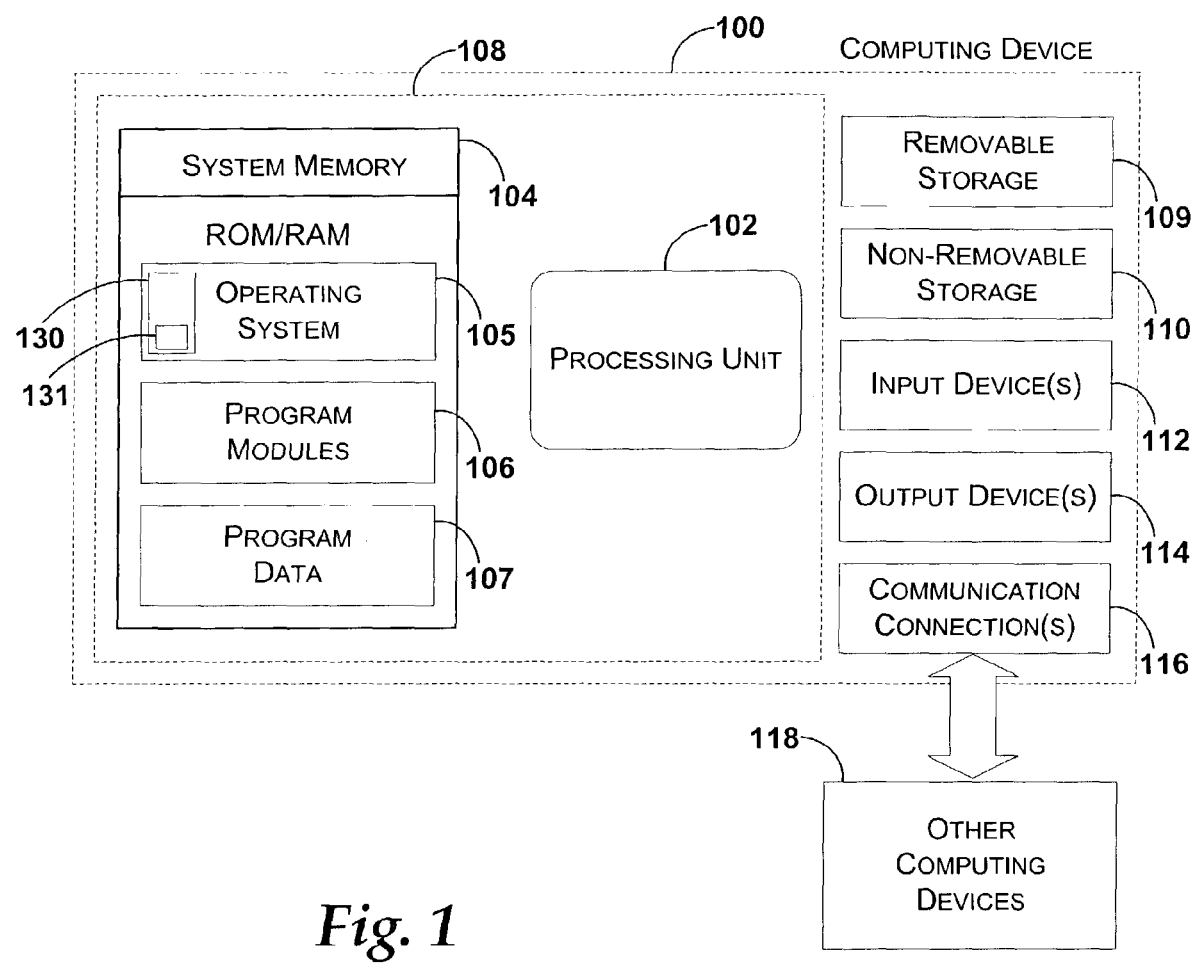
FIG. 1 illustrates an exemplary computing device that may be used in one exemplary embodiment of the present invention.

FIG. 1 illustrates an exemplary computing device that may be used in one exemplary embodiment of the present invention. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. The operating system 105 includes a command processor 130 that executes operating system commands. The command processor 130 includes a shell 131 (i.e., the command processor interface) that accepts the operating system commands. The shell may display a command prompt, may display a graphical user interface, or any other means for inputting and interpreting user input. The shell 131 verifies that the entered commands are valid and sends the verified commands onto another part of the command processor 130 for execution. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well know in the art and need not be discussed at length here.

Computing device 100 may also contain communication connections 116 that allow the device to communicate with other computing devices 118, such as over a network. Communication connections 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
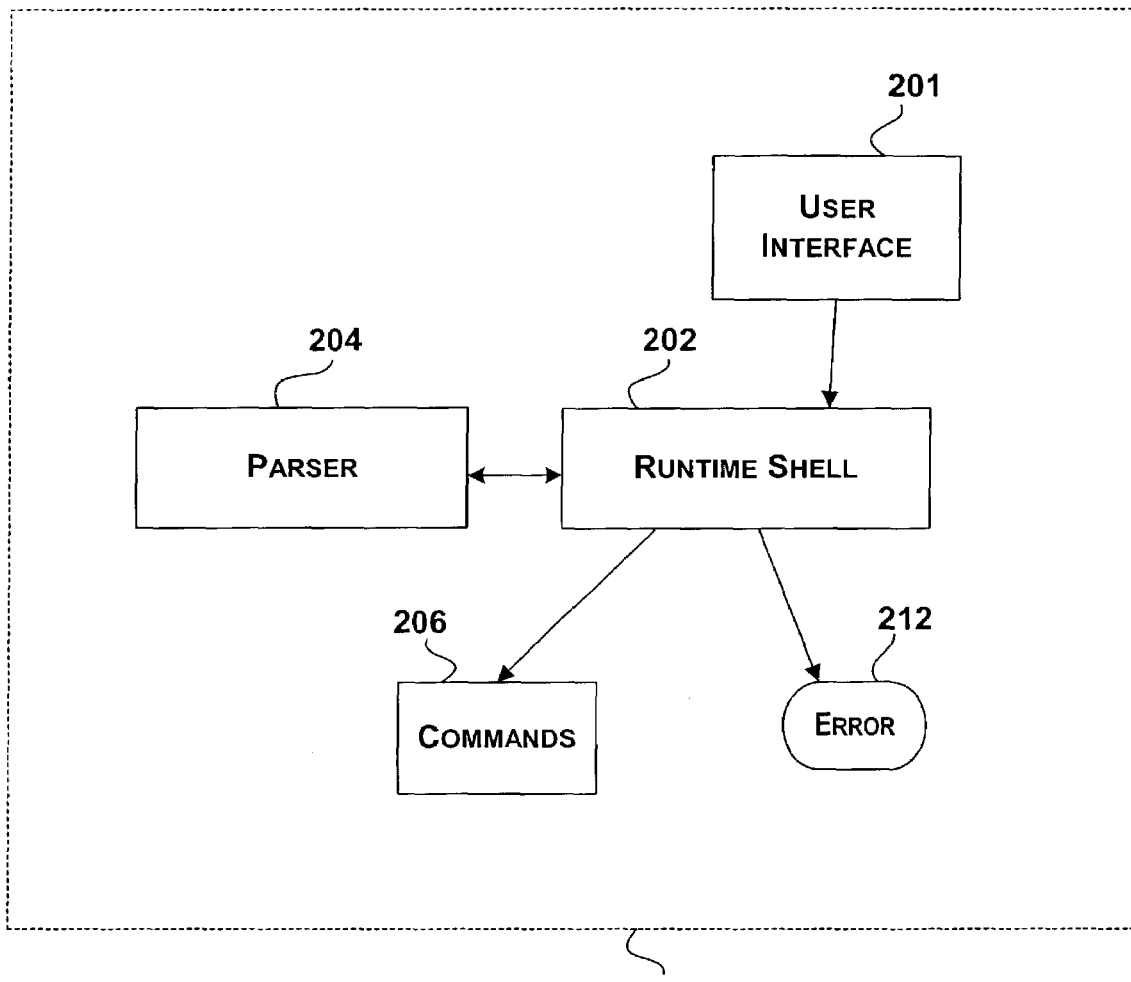
FIG. 2 is a functional block diagram generally illustrating components of one embodiment of a command line architecture in which the present invention may operate.

FIG. 2 is a functional block diagram generally illustrating components of one embodiment of a command line architecture (the "framework") 200 in which the present invention may operate. The framework 200 is preferably installed on a computing system, such as the computing device 100 described above. In this particular embodiment, the framework 200 is an object-based architecture in which commands issued on a command line generate an object that includes the results of the command. The object is passed from one command to the next command in the pipeline. This mechanism enables vastly superior performance and control over text-based command line architectures. The focus of the following discussion is on an error-object, but the framework may have other objects and mechanisms which are not described here for the sake of brevity and clarity. The lack of a discussion here of those other mechanisms does not imply that the present invention is not applicable in the presence of those other mechanisms. For more information about one particular object-based command-line architecture which is particularly suited to the present invention, refer to U.S. patent application Ser. No. 10/882419, entitled System and Method for Employing Object-Based Pipelines, which is owned by the same assignee as the present invention, and is incorporated here by reference.

The framework 200 includes a user interface 201, a runtime engine 202, a parser 204, and several commands 206. Components of the framework 200 may be part of the operating system 105 shown in FIG. 1, they may be separate components that are added to the computing system, or they may be some combination of the two.

The user interface 201 allows a user to provide commands to the computing system. The user interface also provides a mechanism to present feedback to the user, such as by displaying the results of a command. The user interface 201 may be graphical, textual, audible, or the like.

Generally speaking, the runtime engine 202 manages the flow of information through the framework. The runtime engine 202 interacts with the user interface 201 to receive command-line instructions. In the case where a command-line instruction is complex and contains multiple commands in a pipeline, the runtime engine 202 may interface with a parser 204 to decompose the command line instruction into its constituent commands. The parser 204 may additionally resolve any parameters that may be associated with a particular command and identify those to the runtime engine 202. The runtime engine 202 also interacts with the user interface to present any output to the user.

The commands 206 are, typically, executable components directed at managing system properties. The commands 206, when invoked, perform some action, such as query a file system for a list of filenames or copy a particular group of files from one location to another. The scope of particular actions that may be taken by a base command is unlimited, and many alternatives will become apparent with very little experimentation.

The commands 206 may also be configured to perform an additional action on the results of another command 206, thus enabling pipelining. Commonly, commands 206 used in a pipeline perform supplemental actions such as formatting the output or altering the results of another command. One example of such an action may be to rename each file identified by a directory-query command. Still another command may alter a permission or other attribute of the files once they are renamed.

Figure 3:
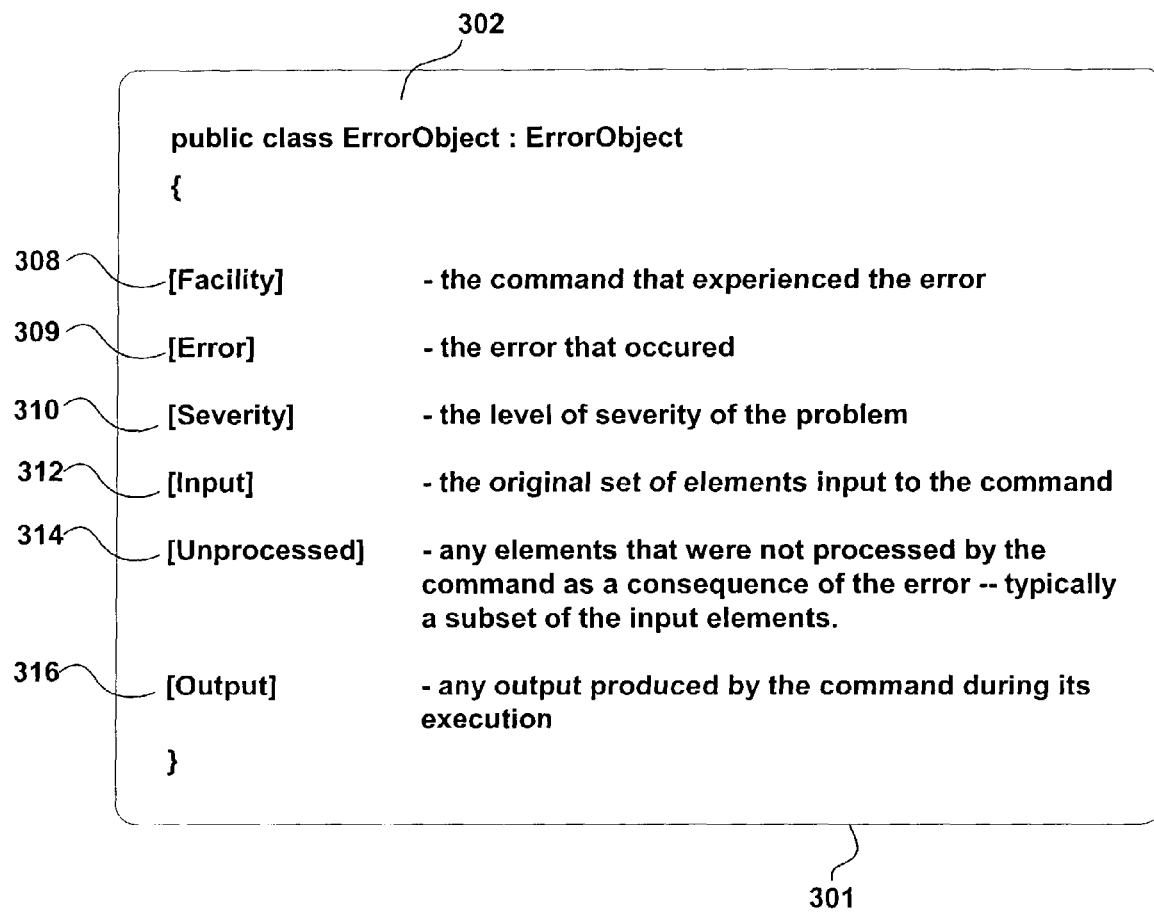
FIG. 3 is a graphical representation of the structure of an error object that may be used in implementations of the invention.

In this embodiment, the commands 206 and pipeline commands 206 are configured to create an "error object" 212 that contains instances of any errors that occur while processing the command's intended action. One example of an acceptable error object 212 is illustrated in FIG. 3 and described below. Briefly stated, the error object 212 defines several elements or properties that can contain instances of a particular error generated while a command is processing. The class definition for the error object 212 may be provided by the framework 200, or it may be supplied with one or more of the commands 206. As one command in a command-line instruction encounters an error, an instance of that error is added to the error object 212. There may be one error object 212 that is shared among commands in a command-line instruction, or each command may have a separate error object 212.

FIG. 3 is a graphical representation of the structure of an error object 301 that may be used in implementations of the invention. The graphical representation generally takes the form of a definition or class that describes elements that may appear in a typical error object 301. At minimum, the error object 301 includes sufficient information to identify resources that were unprocessed during an execution of a command. In one particular implementation, the error object 301 includes a facility element 308, a severity element 310, an input element 312, an unprocessed element 314, and an output element 316.

The facility element 308 identifies the particular command that experienced the error. In other words, if a command-line instruction includes multiple commands, the facility element 308 identifies with which command the error object is associated. The severity element 310 identifies the level of severity of the error. The severity element 310 may contain some numeric or other identifier of the severity.

The input element 312 contains the original set of resources processed by the command. In an object-based pipeline architecture, the input element 312 may include objects that represent the resources operated on by the command. In a non-object-based architecture, the input element 312 may contain other information, such as textual information associated with the input to the command.

The unprocessed element 314 identifies any resources that were not processed by the command as a consequence of the error. This is typically a subset of the input elements 312. Again, the resources contained in the unprocessed element 314 may be objects or other data.

The output element 316 contains any output produced by the command during its execution. Data stored in the output element 316 is typically those resources from the input element 312 that were correctly processed by the command. As noted above, the use of objects to contain the output of a command in a pipeline makes the framework of the present invention superior to mere text-based systems.

Each of these elements may contain information of various types. Preferably, resources and information is stored in each element in their original internal format. Thus, if the resources being operated on by a command are in object-form, they are stored in the input element as objects. Likewise, if the particular command is identified by an alphanumeric string, that information could be stored in a string-type facility element 308.

Figure 4:
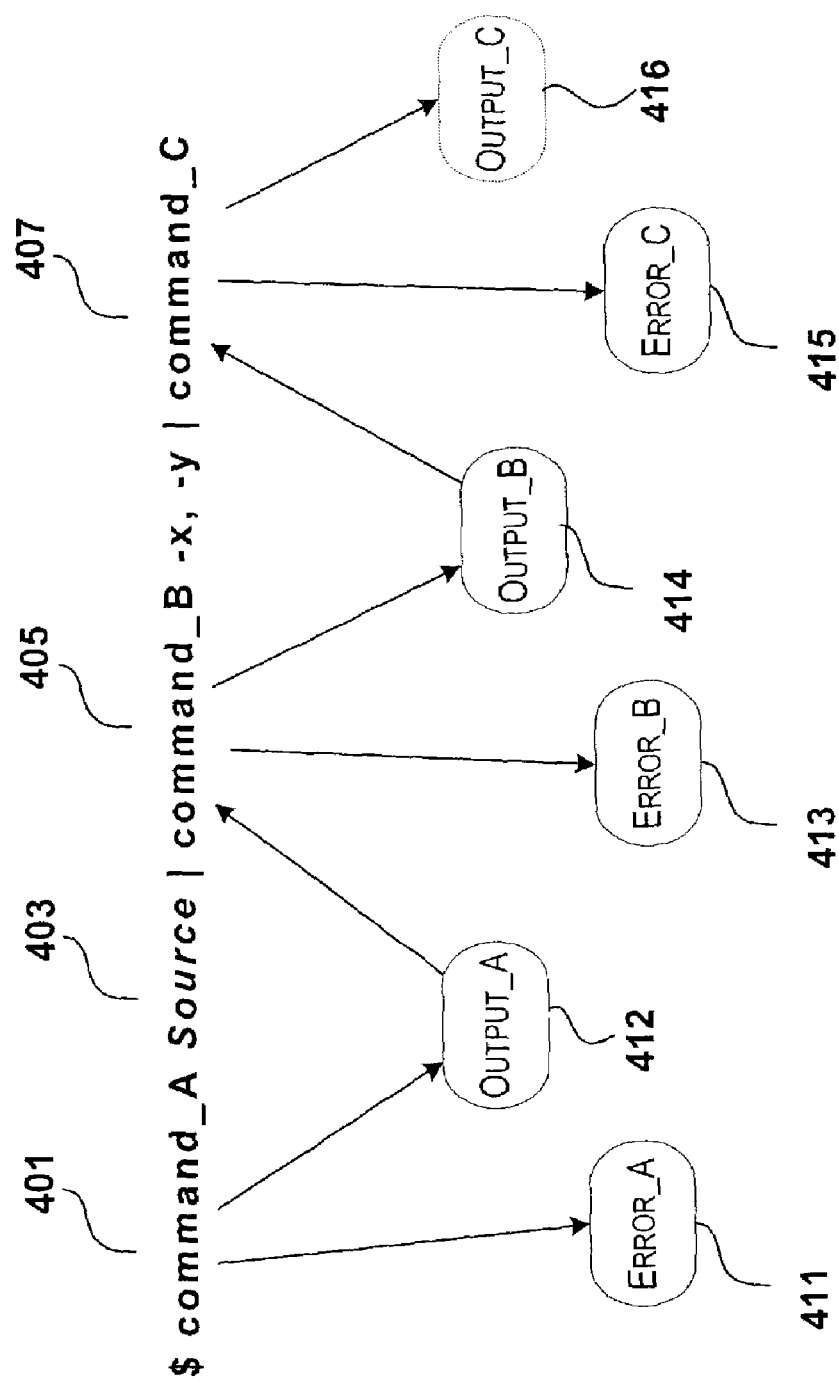
FIG. 4 is a graphical representation of a complex command-line instruction with three commands, which may be input to a system implementing the present invention.

FIG. 4 is used to better illustrate how one implementation of the invention may be used to process information. FIG. 4 is a graphical representation of a complex command-line instruction with three commands separated by a "|" character. As shown, a first command (command_A) 401 operates on some source information 403. The source information 403 may identify or constitute the input to the first command. In this particular implementation, if the first command 401 encounters an error during processing it creates an error object 411 that contains information about the error.

The error object 411 may be configured substantially as described in conjunction with FIG. 3. Alternatively, the error object 411 may contain only information about unprocessed resources and another object, an output object 412, may include the results or output of the first command 401. If the error object 411 includes both error information and output information, the error object 411 should be passed to subsequent commands in the pipeline. Alternatively, if a separate output object 412 is used, the error object 411 need not necessarily be passed to the next command in the pipeline. In that case, the error object 411 should be made available for subsequent processing, such as by subsequent command-line instructions.

Once the first command 401 has completed processing, the second command (command_B) 405 operates on the output of the first command 401. Again, as illustrated in FIG. 4, the first command 401 may create an error object 411 substantially as described in conjunction with FIG. 3 (i.e., including the input, output, and errors). Or, alternatively, the first command 401 may create an output object 412 separate from the error object 411. In this case, the information in the error object 411 may be limited to only information identifying the unprocessed input resources.

In like manner, the second command 405 may encounter an error while processing. Information about that error may be stored in a second stage error object 413. The output of the second command 405 may be included in the second stage error object 413, such as described in conjunction with FIG. 3, or the output may be contained in a separate output object 414. Similarly, the second stage error object 413 or the output object 414 may be passed to the third command (command_C) 407. In turn, the third command 407 may encounter an error and generate a third stage error object 415. The third command 407, being the last command in the pipeline, may simply output its results using a user interface (e.g., user interface 201 in FIG. 2), or it may generate yet another output object 416 for use programmatically by other components, or some combination of the two.

Note that although each stage in the command-line instruction generated its own error object, such is not necessary to the invention. A single error object could be used with error information from each stage in the pipeline being added to the single error object.

In this particular embodiment, the error objects for each stage are preserved as part of a command history. Using the command history, the error objects are available as input to diagnostic processes and subsequent commands. They are directly accessible in the same manner as any other aspect of system state. For example, if a set of files is being copied from one location to another and a subset of those files fail to copy due to access violations, the unprocessed object list will represent that subset of files that were not copied. This allows the operator to remedy the access issue and then use the unprocessed object set as input to complete the copy. Once the error has been remedied, the operator may issue a new command-line instruction that references an error object from the previous instruction. Typically, each instruction or command line has an identifier such as a line number or the like. The operator may call upon an error object from a previous command line by referring to it by line number and possibly stage number (i.e., relative location in a pipeline). The system may have a predefined number of lines (i.e., number of command-line instructions) for which it will persist error objects. For example, the system may preserve error objects for the most recent 50 command-line instructions, allowing a user or administrator to access unprocessed resources for any stage of the last 50 instructions.

By using the error object 212, a user that issues a complex command-line instruction has available information about the resources that were not properly processed by the command-line instruction. This information has been unavailable in previous command-line architectures.

Figure 5:
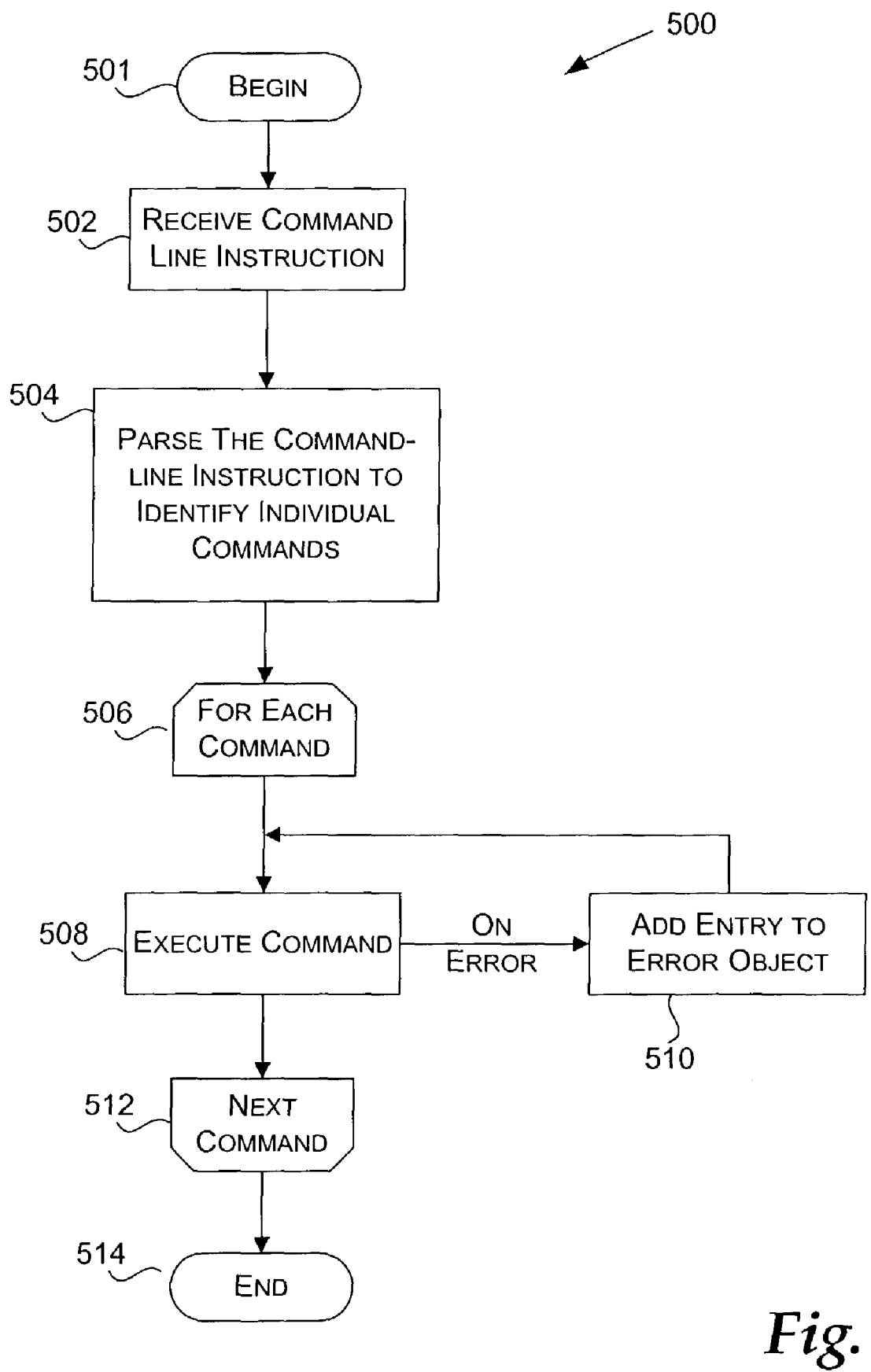
FIG. 5 is a logical flow diagram illustrating general steps in a process for persisting error information generated in a command-line environment, in accordance with one implementation of the present invention.

FIG. 5 is a logical flow diagram illustrating general steps in a process for persisting error information generated in a command-line environment, in accordance with one implementation of the present invention. The process 500 begins at block 502 where the runtime engine receives a command-line instruction entered through the user interface. Processing continues at block 504.

At block 504, the command-line instruction is parsed to identify each individual command contained within the complex command-line instruction. The runtime engine may invoke a parser to perform this step. The process continues at block 506.

Block 506 begins a processing loop that is performed on each command identified at block 504. The loop enters at block 506 and concluded at block 512. Accordingly, the loop begins with the first identified command at block 508, and iteratively repeats until each command is processed.

At block 508, the currently identified command is executed. In this embodiment of the invention, the current command may perform conventional actions, such as query directory listings or like. Preferably, the command creates and/or interacts with an object by inserting any results of its processing into the object for subsequent use by other commands. In the event that an error occurs while the current command is executing, the process proceeds to block 510.

At block 510, an entry describing the error is added to an error object. Will be appreciated that the error object may be created on the first occurrence of an error. Alternatively, the object may include the results of successful processing by the command, in which case the error object may be immediately created once the current command begins generating output. The entry in the error object the including an identification of the current command, an identification of the severity of the error, an identification of the type of the error that occurred, an instance of the unprocessed resource (e.g. in object form), and the like. The object may also include other information, such as the set of input and the output of the current command.

Once the current command has completed execution, the process loops, from block 512 back to block 506, to process the next command in the command-line instruction. Once each command has been process, the process terminates at block 514.

At the termination of the process, a series of error objects, one for each stage in the command-line instruction having encountered an error, exists for subsequent use either directly by an administrator or, perhaps, programmatically by error correction utilities. Alternatively, the error information from each stage in the command-line instruction may be included into one larger, more complex object. In this way, unlike previous command-line environments, unprocessed resources or the for subsequent processing without undue administration to discover which particular resources were unprocessed.

The above specification, examples and data provide a complete description of the manufacture and use of the composition of the invention. Since many embodiments of the invention can be made without departing from the spirit and scope of the invention, the invention resides in the claims hereinafter appended.

We claim:

1. Computer-readable storage media having computer executable instructions, the instructions comprising:
   receiving a command-line instruction containing a command configured to perform an action involving resources;
   executing the command; and
   in the event of an error while executing the command, storing information about the error in an object for subsequent use by another command, the information including an identification of any resources unprocessed due to the error, an identification of a severity of the error, and an identification of any resources input to the command for execution.

2. The computer-readable storage media of claim 1, wherein the command line instruction includes a plurality of commands configured as a pipeline.

3. The computer-readable storage media of claim 2, further comprising, prior to executing the command, parsing the command-line instruction to identify each command in the plurality of commands.

4. The computer-readable storage media of claim 1, wherein executing the command comprises creating an object in which is stored results of executing the command.

5. The computer-readable storage media of claim 1, wherein the object comprises an error object that includes an identification of the error and an instance of any unprocessed resources due to that error.

6. The computer-readable storage media of claim 5, wherein the error object further comprises the identification of the severity of the error.

7. The computer-readable storage media of claim 6, wherein the error object further comprises the identification of said any resources input to the command for execution.

8. The computer-readable storage media of claim 1, wherein the command-line instruction is received and the command is executed in an object-based command-line environment.

9. A computer-implemented method for executing commands in a command-line environment, comprising:
   receiving a command-line instruction containing a plurality of commands, each command been configured to perform an action involving resources;
   parsing the command-line instruction to identify each command in the plurality of commands;
   executing a first identified command;
   in the event of an error while executing the first identified command, storing information about the error in an error object for subsequent use by another command, the information including an instance of any resource unprocessed by the first identified command due to the error;
   wherein the error object further comprises an identification of a severity of the error; and
   wherein the error object further comprises an identification of any resources input to the first identified command.

10. The computer-implemented method of claim 9, wherein the error object further comprises results of executing the first identified command.

11. Computer-readable storage media encoded with a data structure storing information for subsequent use by a subsequent command, the data structure comprising:

a first field identifying a command in a command-line environment, the command being configured to perform an action on resources;

a second field identifying an error that occurred while processing the command;

a third field identifying resources that were unprocessed by the command due to the occurrence of the error;

a fourth field identifying the severity of the error; and a fifth field identifying resources input to the command for processing by the command, and effective to enable the subsequent command to process at least one of the resources that were unprocessed by the command due to the occurrence of the error.

12. The computer-readable storage media of claim 11, wherein the data structure further comprises a sixth field identifying output generated by the command during processing.

13. Computer-readable storage media encoded with a first data structure and a second data structure, the first data structure or the second data structure storing information for subsequent use by a subsequent command, the first data structure comprising:

a first field identifying a command in a command-line environment, the command being configured to perform an action on resources;

a second field identifying an error that occurred while processing the command; and a third field identifying resources that were unprocessed by the command due to the occurrence of the error, the second data structure comprising:

a first field that identifies resources input to the command for processing and instances of the resources input to the command; and a second field that identifies results of processing the command, and the first data structure or the second data structure effective to enable the subsequent command to process at least one of the resources that were unprocessed by the command due to the occurrence of the error.

14. The computer-readable storage media of claim 13, wherein the second field of the second data structure include instances of objects representing the results of processing the command.

15. The computer-readable storage media of claim 13, wherein the first data structure and the second data structure in combination are effective to enable the subsequent command to process at least one of the resources that were unprocessed by the command due to the occurrence of the error.

* * * * *